Jan. 15, 1924.
B. M. McMILLION
HOOD FASTENER
Filed April 14, 1922
1,481,216
2 Sheets-Sheet 1
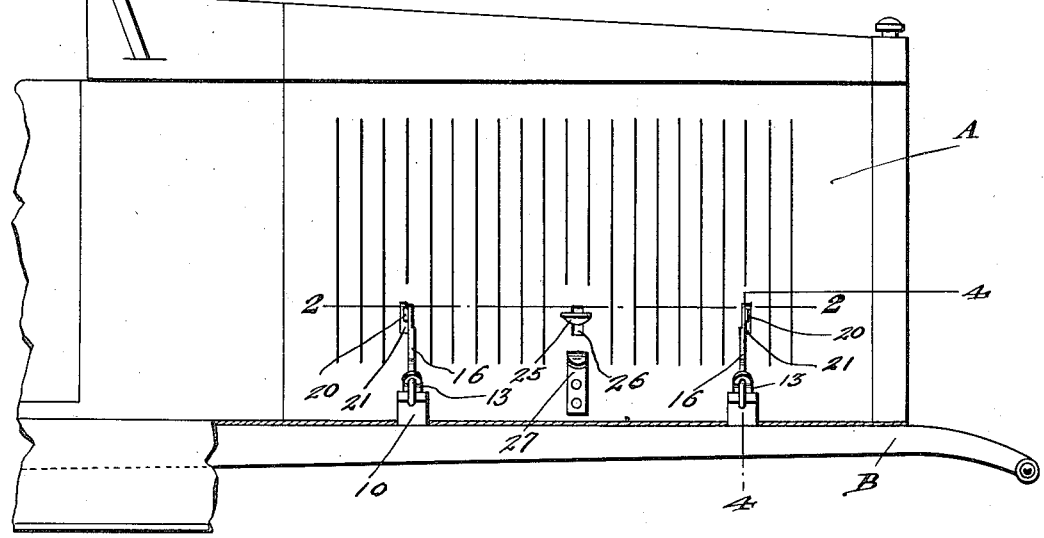
*Fig. 1.*
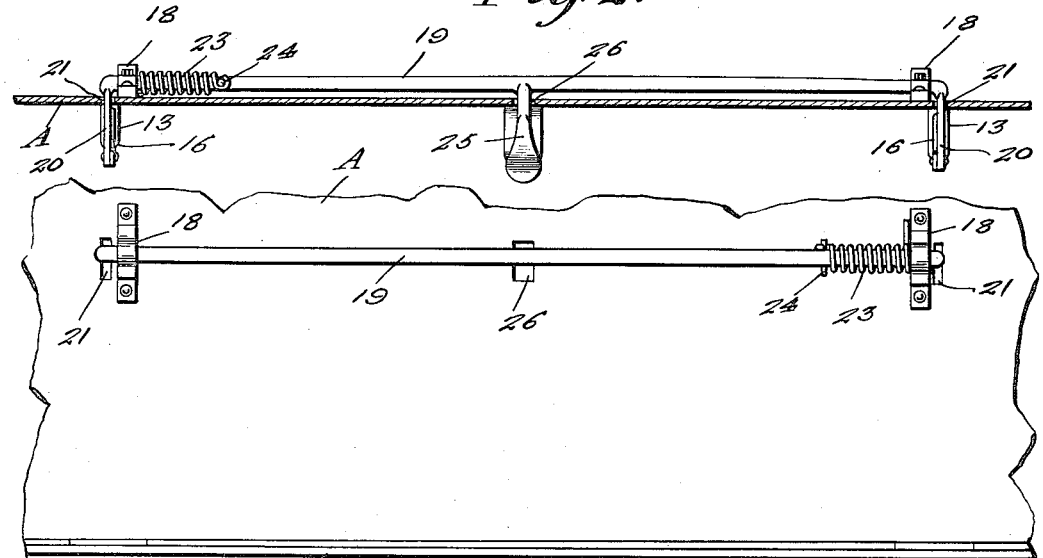
*Fig. 2.*
*Fig. 3.*
B. M. McMillion INVENTOR Jan. 15, 1924.
B. M. McMILLION
HOOD FASTENER
Filed April 14, 1922
1,481,216
2 Sheets-Sheet 2
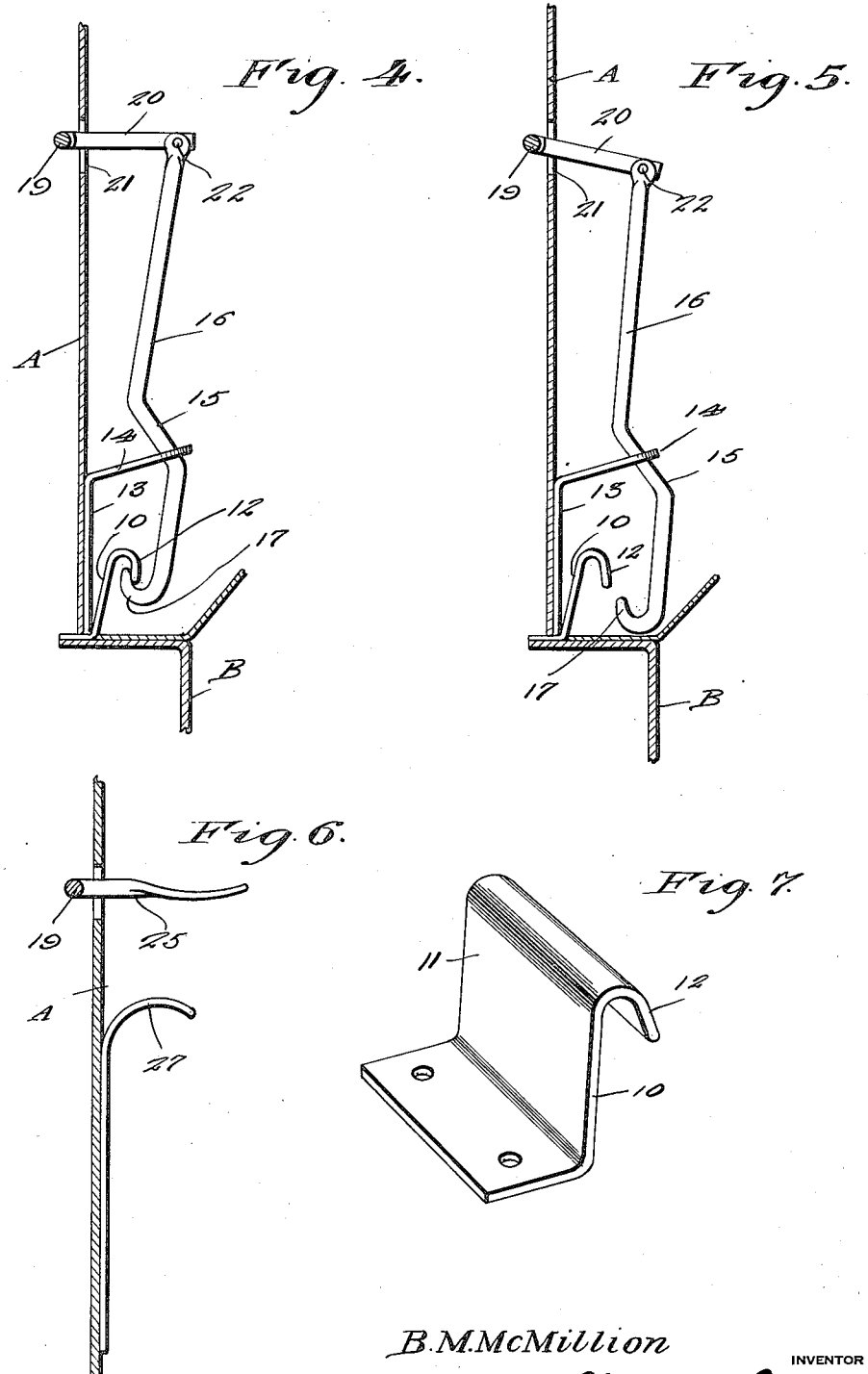

Patented Jan. 15, 1924.

1,481,216

UNITED STATES PATENT OFFICE.

BUFORD M. McMILLION, OF ROGERS, TEXAS.

HOOD FASTENER.

Application filed April 14, 1922. Serial No. 552,675.

*To all whom it may concern:*

Be it known that I, BUFORD M. McMILLION, a citizen of the United States, residing at Rogers, in the county of Bell and State of Texas, have invented new and useful Improvements in Hood Fasteners, of which the following is a specification.

This invention relates to the hoods of automobiles and other similar structures in which use is made of a slidable or otherwise movably mounted plate member, and has for its object the provision of a novel fastening means which is capable of release by one hand so that the operator may have his other hand free for some other use.

An important object is the provision of a fastening device for automobile hoods provided with a release lever located between the two fastening members commonly provided and operable to release both fasteners simultaneously so that the hood may be lifted by one hand only, thus enabling the operator to make minor adjustments, to replenish his oil supply, or to accomplish other things with the other hand.

An additional object is the provision of a device of this character which will be simple and inexpensive in manufacture and installation, easy to operate, efficient and durable in service and a general improvement in the art.

With the above and other objects and advantages in view, the invention consists in the details of construction to be hereinafter more fully described and claimed, and illustrated in the accompanying drawings, in which:

Figure 1 is a side elevation of an automobile hood equipped with my device and showing the same in locked position.

Figure 2 is a horizontal sectional view on the line 2—2 of Figure 1,

Figure 3 is a view looking at the side of the hood from the inside,

Figure 4 is a vertical section on the line 4—4 of Figure 1 showing the parts in locked position, Figure 5 is a similar view showing the parts in unlocked position, Figure 6 is a vertical section taken along the operating handle, Figure 7 is a detail perspective view of the bracket secured upon the frame bar.

Referring more particularly to the drawings the letter A designates a portion of the hood of an automobile and B designates one of the frame bars of the chassis. In carrying out my invention I provide a pair of retaining brackets 10 which are suitably secured upon the frame bar B and which include vertical portions 11 having their upper edges formed with over hanging flanges 12.

Secured upon the hood at the lower edge thereof is a pair of brackets 13 formed with upwardly and outwardly inclined ears 14 through which pass the inclined intermediate portions 15 of latch rods 16 which have their lower ends terminating in hooks 17 engageable beneath the flanges 12.

Secured upon the inner side of the hood are bearing brackets 18 through which is journaled a rock shaft 19 which is provided at its ends with crank arms 20 which operate through elongated slots 21 in the hood. The upper ends of the latch rods 16 are pivotally connected with the projecting outer ends of the crank arms 20 as shown at 22. Encircling the rock shaft is a spring 23 which has one end secured to a pin 24 projecting from the shaft and which has its other end bearing against the inside of the hood adjacent one of the brackets 18. The purpose of this spring is to hold the rock shaft in position so that the latch rods 16 will be maintained in their highest positions with the hooks 17 firmly engaging beneath the flanges 12 as shown in Figures 1 and 4.

Extending from the central portion of the rock shaft is a thumb piece 25 which projects through an elongated slot 26 in the hood and which is spaced slightly from a handle 27 secured on the outside of the hood.

When the hood is in normal or closed position the hooks 17 engage the flanges 12 as above described and such engagement is maintained by the spring 23 which furthermore operates to prevent any looseness and consequent rattling. When it is desired to open the hood, the operator places his forefinger beneath the handle 27 and presses upon the thumb piece 25 with his thumb. This will result in rotation of the rock shaft and consequent downward movement of the crank arms 20. When this occurs the latch rods 16 will be moved downwardly and as the inclined portions 15 thereof pass through the apertured ears 14 the lower ends of the latch rods will be moved not only downwardly out of engagement with the flanges 12 but also outwardly to be in non-obstructing relation so that the operator may then lift the hood by means of the handle 27, one hand only being necessary in accomplishing this entire operation.

From the foregoing description and a study of the drawings it will be apparent that I have thus provided a simply constructed an consequently inexpensive hood fastener which will be efficient in its holding action while easily releasable to permit opening of the hood when such is desired. Owing to the simplicity of the construction and the fewness of the parts it is apparent that there is nothing to get out of order and that the device will consequently have a long life and satisfactorily perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. A hood fastening device comprising flanged brackets secured upon the frame bar of an automobile chassis adjacent the lower edge of the hood, brackets secured upon the hood near the lower edge thereof, a rock shaft journaled upon the inner side of the hood and having crank arms operating through slots in the hood, means normally holding the rock shaft at one limit of its movement, latch rods pivoted upon said crank arms and slidable through said second named brackets with their lower ends terminating in hooks engaging said flanges, a handle on the outside of the hood and a thumb piece carried by the rock shaft and projecting through a slot in the hood with its outer end located adjacent said handle.

2. A hood fastening device comprising flanged brackets secured upon the frame bar of an automobile chassis adjacent the lower edge of the hood, brackets secured upon the hood near the lower edge thereof, a rock shaft journaled upon the inner side of the hood and having crank arms operating through slots in the hood, means normally holding the rock shaft at one limit of its movement, latch rods pivoted upon said crank arms and slidable through said second named brackets with their lower ends terminating in hooks engaging said flanges, a handle on the outside of the hood and a thumb piece carried by the rock shaft and projecting through a slot in the hood with its outer end located adjacent said handle, the latch rods having their intermediate portions inclined and said second named brackets being formed with holes through which said inclined portions pass whereby to exert a cam action for moving the lower ends of the latch rods away from the hood to clear the flanges.

In testimony whereof I affix my signature.

BUFORD M. McMILLION.